(12) United States Patent
Fukuzawa

(10) Patent No.: US 7,167,794 B2
(45) Date of Patent: Jan. 23, 2007

(54) CONTROL APPARATUS FOR AN INTERNAL COMBUSTION ENGINE

(75) Inventor: Yousuke Fukuzawa, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/214,994

(22) Filed: Aug. 31, 2005

(65) Prior Publication Data
US 2006/0229798 A1 Oct. 12, 2006

(30) Foreign Application Priority Data
Apr. 12, 2005 (JP) ............................. 2005-114483

(51) Int. Cl.
*F02D 45/00* (2006.01)
*G01M 15/05* (2006.01)

(52) U.S. Cl. ............... 701/114; 123/406.13; 123/479; 73/1.59; 73/118.1

(58) Field of Classification Search .................. None
See application file for complete search history.

(56) References Cited

U.S. PATENT DOCUMENTS 4,483,299 A * 11/1984 Otobe et al. ............... 123/479

6,588,259 B2 * 7/2003 Lodise et al. .............. 73/117.3

FOREIGN PATENT DOCUMENTS

JP   2002-295300 A   10/2002

* cited by examiner

*Primary Examiner*—Andrew M. Dolinar
(74) *Attorney, Agent, or Firm*—Sughrue Mion, PLLC

(57) ABSTRACT

A control apparatus for an internal combustion engine can detect a tubing disconnection failure of an intake pressure sensor thereby to make it possible to give a warning to a user and to take appropriate measures to cope with such a failure situation. A control unit controls the engine based on a throttle opening, an intake pressure measured by an intake pressure sensor, and a rotational speed and a crank angle of the engine. The intake pressure sensor is connected to the intake system through tubing. The control unit includes a failure diagnosis section that detects an abnormality of the intake pressure sensor. The failure diagnosis section detects an open circuit or a short circuit of a signal line between the intake pressure sensor and the control unit based on a change in the intake pressure, and also detects a disconnection failure of the tubing of the intake pressure sensor.

7 Claims, 5 Drawing Sheets

CONTROL APPARATUS FOR AN INTERNAL COMBUSTION ENGINE

BACKGROUND OF THE INVENTION

1. Field of the Invention

The present invention relates to a control apparatus for an internal combustion engine that controls a V-type two-cylinder internal combustion engine (hereinafter also referred to as an "engine") used for a motorcycle for example, and more particularly, it relates to a control apparatus for an internal combustion engine equipped with a failure diagnosis section capable of detecting a piping or tubing disconnection failure of an intake pressure sensor.

2. Description of the Related Art

In general, a control unit (ECU) of a control apparatus for an internal combustion engine drives various kinds of actuators of the engine (injectors, spark plugs, etc.) based on detection information on the various kinds of sensors. The various kinds of sensors of the engine include an intake pressure sensor that measures an intake manifold pressure in an intake system.

For example, in case of a motorcycle, such a kind of intake pressure sensor is arranged, due to the constraint of a mounting space therefor, in such a manner that it is connected to an intake manifold through tubing for measuring an intake manifold pressure (hereinafter also referred to as an intake pressure) therein. Also, the intake pressure sensor is connected to the control unit through a signal line.

In addition, in such a control apparatus for an internal combustion engine, the control unit includes a failure diagnosis section for detecting an abnormality in the signal line, and serves to detect the abnormality of the signal line (an open-circuit failure or a short-circuit failure) connecting between the intake pressure sensor and the control unit based on the amount of change of the intake pressure. Moreover, when the failure diagnosis section detects an abnormality in the signal line, the control unit inhibits the use of the detection information of the intake pressure sensor which has been determined to be abnormal (see, for instance, a first patent document: Japanese patent application laid-open No. 2002-295300.).

However, in the intake pressure sensor with the piping or tubing arrangement as stated above, atmospheric pressure is introduced into the intake pressure sensor if the tubing comes off or is disconnected, so the intake pressure detected in such a case will indicate the same value as that at the time when the engine is stopped (or when a throttle valve is in a full open state).

Accordingly, when there occurs a tubing disconnection failure of the intake pressure sensor, the failure diagnosis section in the above-mentioned conventional apparatus can not detect a signal line abnormality of the intake pressure sensor, but instead makes a determination that the throttle valve is in its full open state. In this case, the control unit controls to supply a large amount of fuel corresponding to the throttle full open state to the engine in spite of the fact that the engine is in its idle state or the throttle valve is in its fully closed state, as a result of which harmful gas components (HC, CO, etc.) in exhaust emissions will be increased.

Further, since an excessive amount of fuel more than necessary is supplied to the engine, an unburnt gas flows into an exhaust pipe, thus generating an afterburning phenomenon thereby to raise the temperature of the exhaust pipe. Furthermore, since the failure (i.e., abnormality in the signal line) is not displayed, there arises a situation where the engine can not be started despite that the user recognizes that the engine is in the normal state.

In the conventional control apparatus for an internal combustion engine, the failure diagnosis section can not detect the tubing disconnection failure of the intake pressure sensor, so there arises a problem that even if a tubing disconnection failure occurs, it is determined that the throttle valve is in its full open state while the intake pressure sensor is in the normal state, thus supplying a large amount of fuel to the engine thereby to cause the deterioration of the exhaust gas or the like.

SUMMARY OF THE INVENTION

Accordingly, the present invention is intended to obviate the problems as referred to above, and has for its object to provide a control apparatus for an internal combustion engine which is capable of detecting a tubing disconnection failure of an intake pressure sensor thereby to make it possible to give a warning to a user and to take appropriate measures to cope with such a failure situation.

Bearing the above object in mind, according to the present invention, there is provided a control apparatus for an internal combustion engine which includes: a throttle opening detection part that measures a throttle opening of a throttle valve arranged in an intake system of the internal combustion engine; an intake pressure detection part that measures an intake pressure of the intake system; a crank angle detection part that detects a crank angle of the internal combustion engine; a rotational speed detection part that detects a rotational speed of the internal combustion engine; and a control unit that controls the internal combustion engine based on the throttle opening, the intake pressure, the rotational speed and the crank angle. The intake pressure detection part includes an intake pressure sensor connected to the intake system through tubing. The control unit includes a failure diagnosis section that detects an abnormality of the intake pressure detection part. The failure diagnosis section detects an open-circuit or a short-circuit of a signal line between the intake pressure sensor and the control unit based on a change in the intake pressure, and also detects a disconnection failure of the tubing of the intake pressure sensor.

According to the present invention, by detecting a tubing disconnection failure of the intake pressure sensor, it is possible to provide a warning to a user and to take appropriate measures for the occurrence of failure.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described while referring to the accompanying drawings.

Embodiment 1

Figure 1:
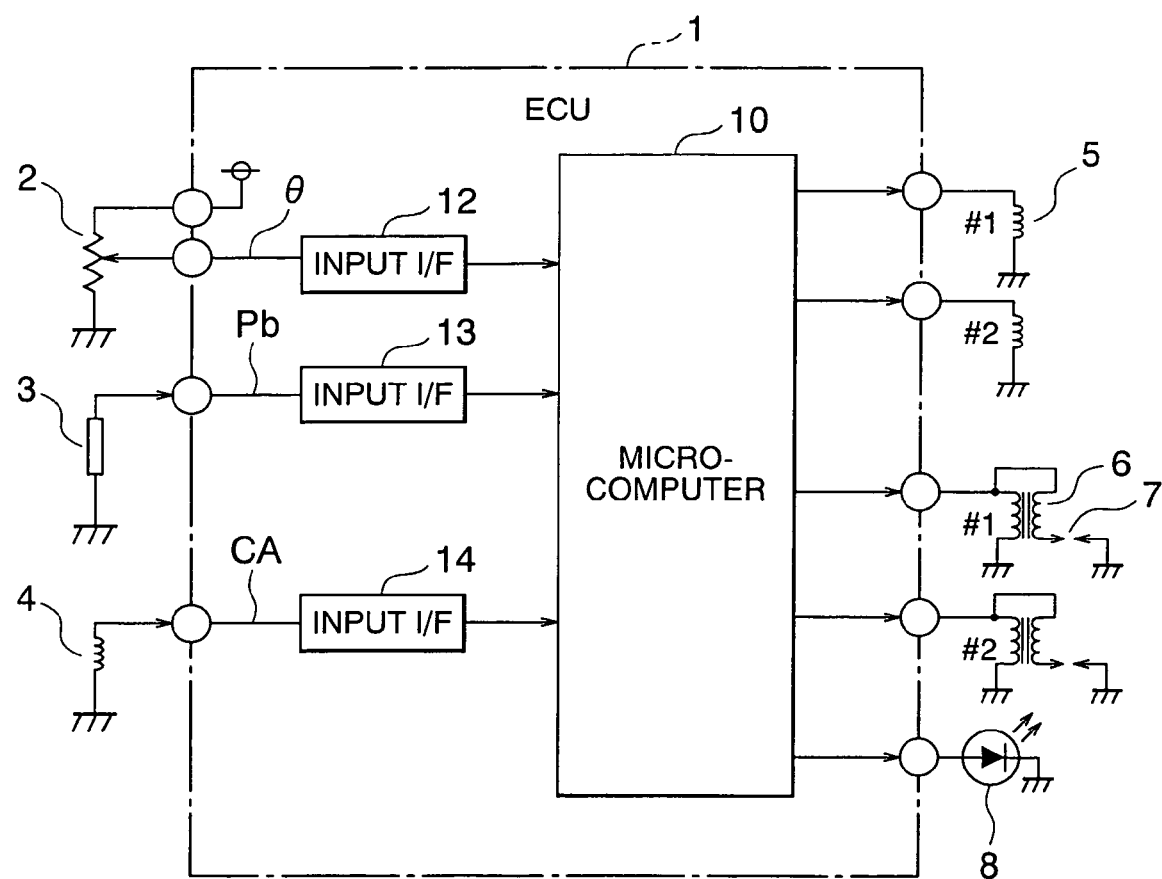
FIG. 1 is a block diagram showing a control apparatus of an internal combustion engine according to a first embodiment of the present invention.

FIG. 1 is a block diagram that shows a control apparatus for an internal combustion engine according to a first embodiment of the present invention, in which the present invention is applied to a V-type two-cylinder engine of a motorcycle.

In FIG. 1, a throttle opening detection part in the form of a throttle opening sensor 2, an intake pressure detection part in the form of an intake pressure sensor 3 and a crank angle detection part in the form of a crank angle sensor 4 are connected, as well-known various kinds of sensors for detecting the operating condition of the engine, to a control unit in the form of an electronic control unit (ECU) 1.

Also, connected to the ECU 1 as well-known various kinds of actuators of the engine are injectors 5 for fuel injection corresponding to respective cylinders #1, #2, ignition coils 6 and spark plugs 7 for ignition corresponding to the respective cylinders #1, # 2, and a warning device in the form of a warning LED 8 adapted to be driven to light upon detection of an abnormality.

The throttle opening sensor 2 serves to measure the throttle opening θ of a throttle valve arranged in an intake system of the engine, and input it to the ECU 1. The intake pressure sensor 3 serves to measure an intake pressure Pb of the intake system (intake manifold) of the engine, and input it to the ECU 1. At this time, as previously stated, tubing is arranged to connect between the intake pressure sensor 3 and the intake manifold.

The crank angle sensor 4 is in the form of an electromagnetic pickup or the like, and serves to create a pulse signal comprising a train of pulses at predetermined angular intervals indicative of the rotational angle position of a crankshaft of the engine and a reference position of each cylinder, and input it to the ECU 1 as a crank angle signal CA. The crank angle signal CA is used to measure the crank angle of the crankshaft in the ECU 1, and contributes to the calculation of the rotational speed Ne of the engine. Accordingly, the crank angle sensor 4 functions as a rotational speed sensor to measure the rotational speed Ne of the engine.

The ECU 1 includes a microcomputer 10 that executes various arithmetic operations, a sensor power supply 11 that feeds electric power to the respective sensors 2 through 4, and input interfaces 12, 13 and 14 that take in or receive the throttle opening θ, the intake pressure Pb and the crank angle signal CA, respectively. The microcomputer 10 controls the internal combustion engine by driving the injectors 5, the ignition coils 6 and the spark plugs 7 in accordance with the results of arithmetic processing based on the throttle opening θ, the intake pressure Pb, the rotational speed Ne and the crank angle signal CA.

In addition, upon detection of an abnormality, the microcomputer 10 in the ECU 1 drives the warning LED 8 to provide a warning of an abnormality occurrence state. That is, the microcomputer 10 includes a failure diagnosis section that serves to detect not only abnormality of the intake pressure sensor 3 but also abnormality of the entire engine. For instance, the failure diagnosis section in the microcomputer 10 detects an open circuit or a short circuit of a signal line between the intake pressure sensor 3 and the ECU 1 based on a change in the intake pressure Pb, and also detects a disconnection failure of the tubing of the intake pressure sensor 3.

At this time, when the amount of change of intake pressure (a differential pressure ΔP between a maximum intake pressure Pmax and a minimum intake pressure Pmin to be described later) in one control period (one control cycle) of the internal combustion engine indicates a predetermined amount of change corresponding to the full open state of the throttle opening θ in the idle state of the internal combustion engine, the failure diagnosis section in the microcomputer 10 determines that the intake pressure sensor 3 is in a state of "tubing disconnection failure".

Here, note that the throttle opening θ and the crank angle signal CA (the rotational speed Ne) contribute to detecting the idle state of the engine, too, as will be described later, and the throttle opening sensor 2 and the crank angle sensor 4 function as sensors for idle detection. Also, an idle switch (not shown) for detecting the idle state of the internal combustion engine may be arranged at a location near the fully closed position of the throttle valve as an other kind of sensor.

Next, reference will be made to the operation of this first embodiment of the present invention as shown in FIG. 1.

First of all, the microcomputer 10 in the ECU 1 performs arithmetic operations based on a voltage signal that indicates the throttle opening 9 and is input from the throttle opening sensor 2, a voltage signal that indicates the intake pressure Pb and is input from the intake pressure sensor 3, the crank angle signal CA that is input from the crank angle sensor 4, and detection signals from other sensors (an air flow sensor, a cooling water temperature sensor, etc.) thereby to acquire various kinds of operating information such as the load state of the engine, the rotational speed Ne of the engine, the crank angle, etc.

Hereinafter, the microcomputer 10 calculates the engine load state and the amount of air in each combustion chamber of the engine on the basis of the information input from the various kinds of sensors thereby to determine the operating condition of the engine, and further calculates the drive timing and the drive time of each injector 5, based on which the injectors 5 are driven to operate. Also, the microcomputer 10 calculates the drive timing of the ignition coils 6 thereby to control the ignition timing of the spark plugs 7. In addition, when the failure diagnosis section in the microcomputer 10 determines that any of the input signals from the various kinds of sensors and actuators (e.g., output devices such as the injectors 5, the ignition coils 6, etc.) is in a faulty or failure state, it drives the warning LED 8 to light so as to provide a warning to a user, thereby prompting the user to perform an engine protection operation and a danger avoidance operation as required.

Figure 2:
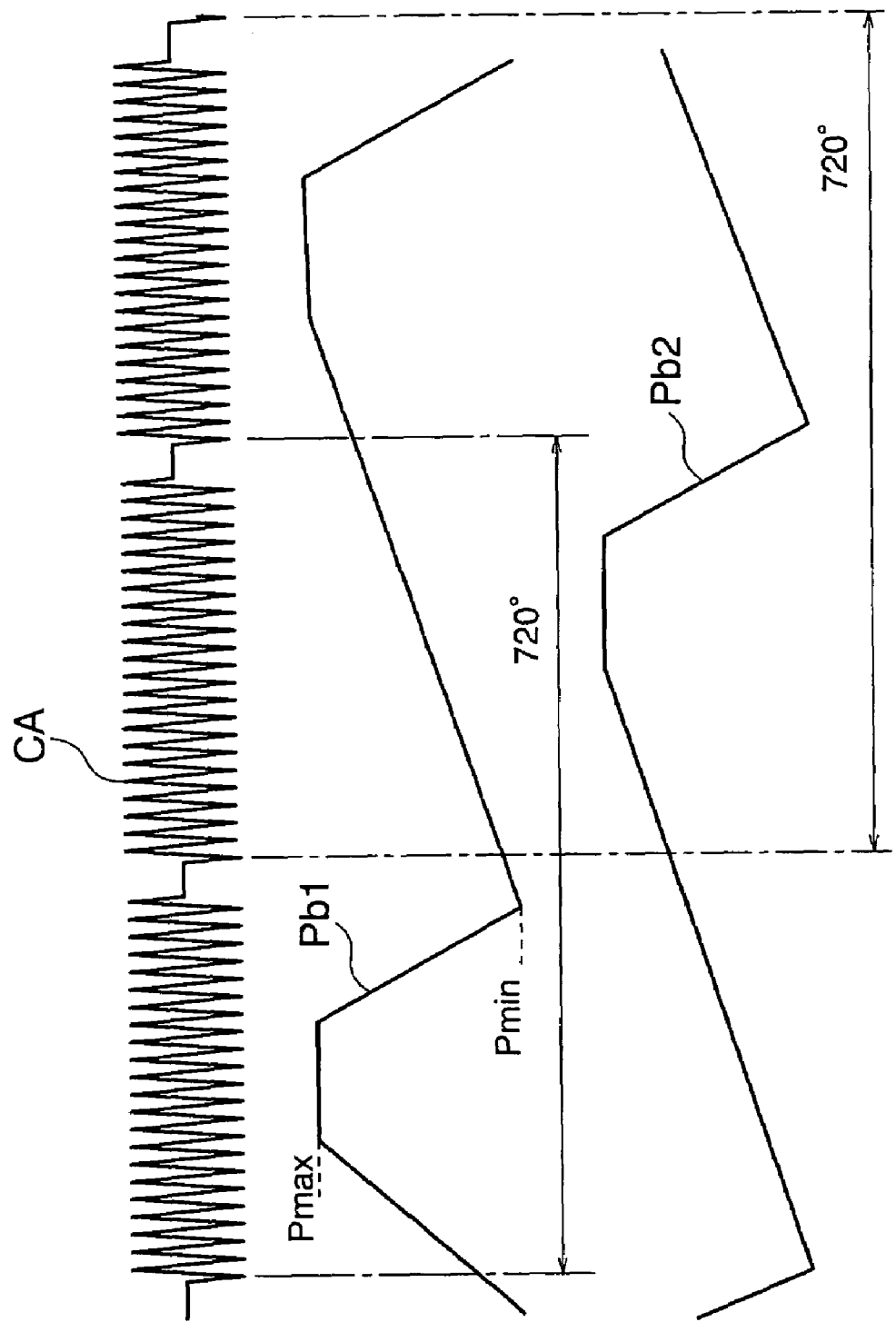
FIG. 2 is a timing chart illustrating an operation example of a V-type two-cylinder engine during normal operation thereof according to the first embodiment of the present invention.

FIG. 2 is a timing chart that illustrates the above-mentioned operations, wherein the relation between the crank angle signal CA and the intake pressure Pb at the time of the idle operation of the V-type two-cylinder engine (or at a low or small throttle opening) is shown. In FIG. 2, there is shown a case where the relation between the crank angle signal CA and intake pressures Pb1, Pb2 in respective cylinders #1, #2 is in a normal state.

In FIG. 2, the intake pressures Pb1, Pb2 in respective intake manifold branch portions become a maximum intake pressure Pmax or a minimum negative pressure (atmospheric pressure) on the exhaust stroke, and a minimum intake pressure Pmin or a maximum negative pressure b on the intake stroke within one control cycle (720 deg. [CA]).

The failure diagnosis section in the microcomputer 10 stores the maximum intake pressure Pmax (atmospheric pressure) and the minimum intake pressure Pmin (the maximum negative pressure) within one control cycle (720 deg. [CA]), and calculates a differential pressure ΔP (=Pmax−Pmin) therebetween, so that it determines that the intake pressure sensor 3 is normal when the differential pressure ΔP is higher than or equal to a predetermined value ΔPo (a predetermined amount of change), whereas it determines that the intake pressure sensor 3 is abnormal when the differential pressure ΔP is lower than the predetermined value ΔPo.

In other words, the measured value of the intake pressure Pb from the intake pressure sensor 3 does not almost change, so a "tubing failure state"of the intake pressure sensor 3 is detected. However, when the rotational speed Ne of the engine is higher than the idle rotational speed, or when the throttle opening θ of the throttle valve is opened to a satisfactory extent (i.e., the idle switch is turned off), the measured value of the intake pressure sensor 3 does not change, so the differential pressure ΔP between the maximum intake pressure Pmax and the minimum intake pressure Pmin becomes small. As a result, a failure determination is inhibited so as to prevent an incorrect determination that the intake pressure sensor 3 is in an abnormal state.

Figure 3:
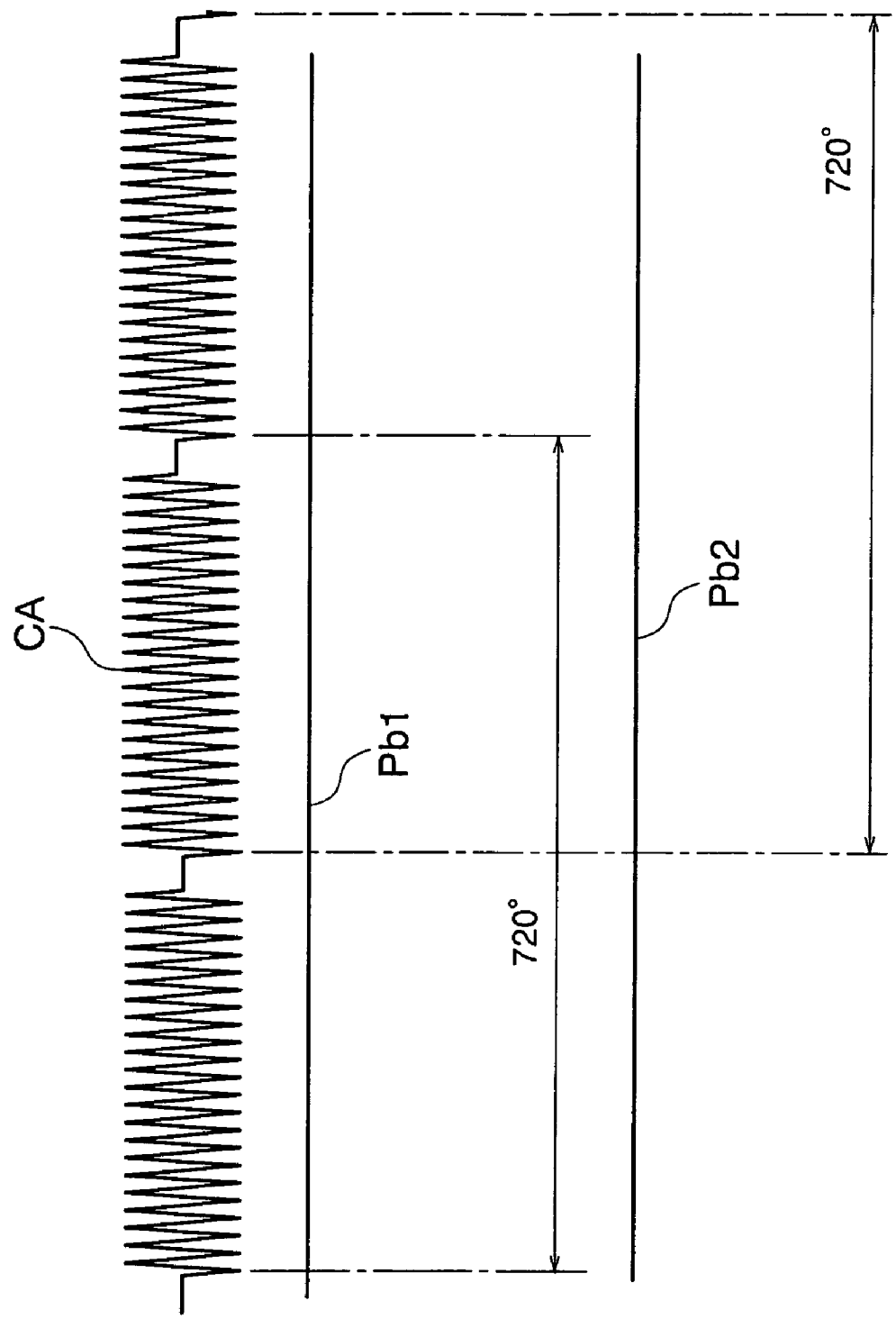
FIG. 3 is a flow chart illustrating an operation example of the V-type two-cylinder engine at the time when a throttle valve is in its full open state according to the first embodiment of the present invention.

FIG. 3 is a timing chart that illustrates the relation between the crank angle signal CA and the intake pressures Pb1, Pb2 when the throttle opening θ is at its full open state. In FIG. 3, the respective intake pressures Pb1, Pb2 indicate substantially constant values (corresponding to the atmospheric pressure) within each control cycle. Accordingly, at the time of the throttle full open state, it is impossible to determine the presence or absence of a failure of the intake pressure sensor 3 based on the intake pressure Pb.

Figure 4:
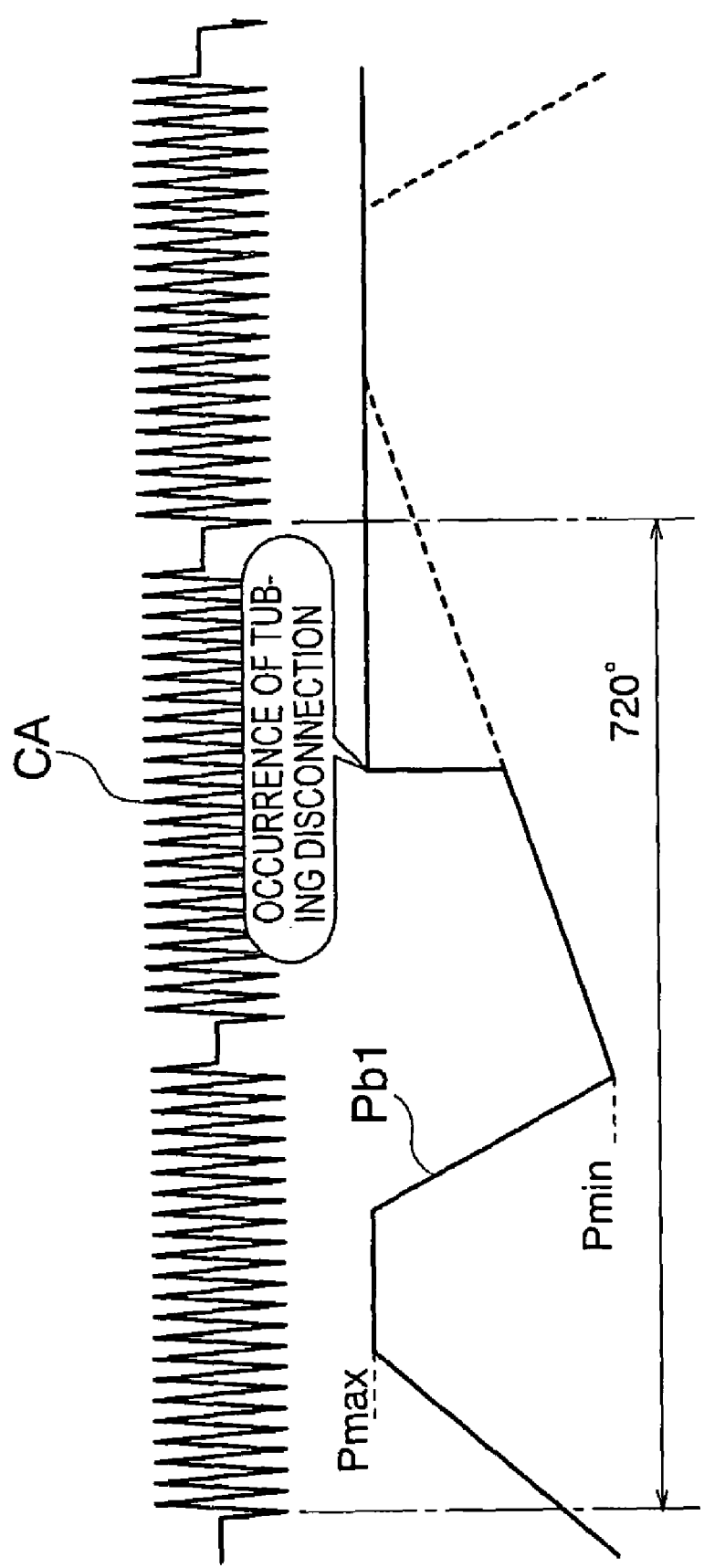
FIG. 4 is a timing chart illustrating an operation example of the V-type two-cylinder engine upon occurrence of a tubing disconnection failure according to the first embodiment of the present invention.

FIG. 4 is a timing chart that illustrates the relation between the crank angle signal CA and the intake pressures Pb1, Pb2 when there occurs a "tubing disconnection failure" of the intake pressure sensor 3. In FIG. 4, upon occurrence of a "tubing disconnection failure", the intake pressures Pb1, Pb2 become the same values (corresponding to the atmospheric pressure) at the time of engine stoppage or at the time of the throttle full open state.

Accordingly, it is found that a highly reliable failure determination can be made without any erroneous or incorrect determination if a tubing disconnection failure determination is carried out with the engine being in an idle state (i.e., with the throttle valve being fully closed and the engine rotational speed being lower than that during the steady-state operation). Here, note that the intake pressure sensor 3 includes a plurality of intake pressure sensors (e.g., two in this case) corresponding in number to the number of the cylinders (e.g., two) so as to individually measure the respective intake pressures Pb1, Pb2 in the cylinders, and a failure diagnosis is executed individually for each cylinder based on the intake pressure Pb1 or Pb2 of each of the plurality of cylinders.

Now, reference will be made to a failure analysis operation according to the first embodiment of the present invention while referring to a flow chart of FIG. 5.

Figure 5:
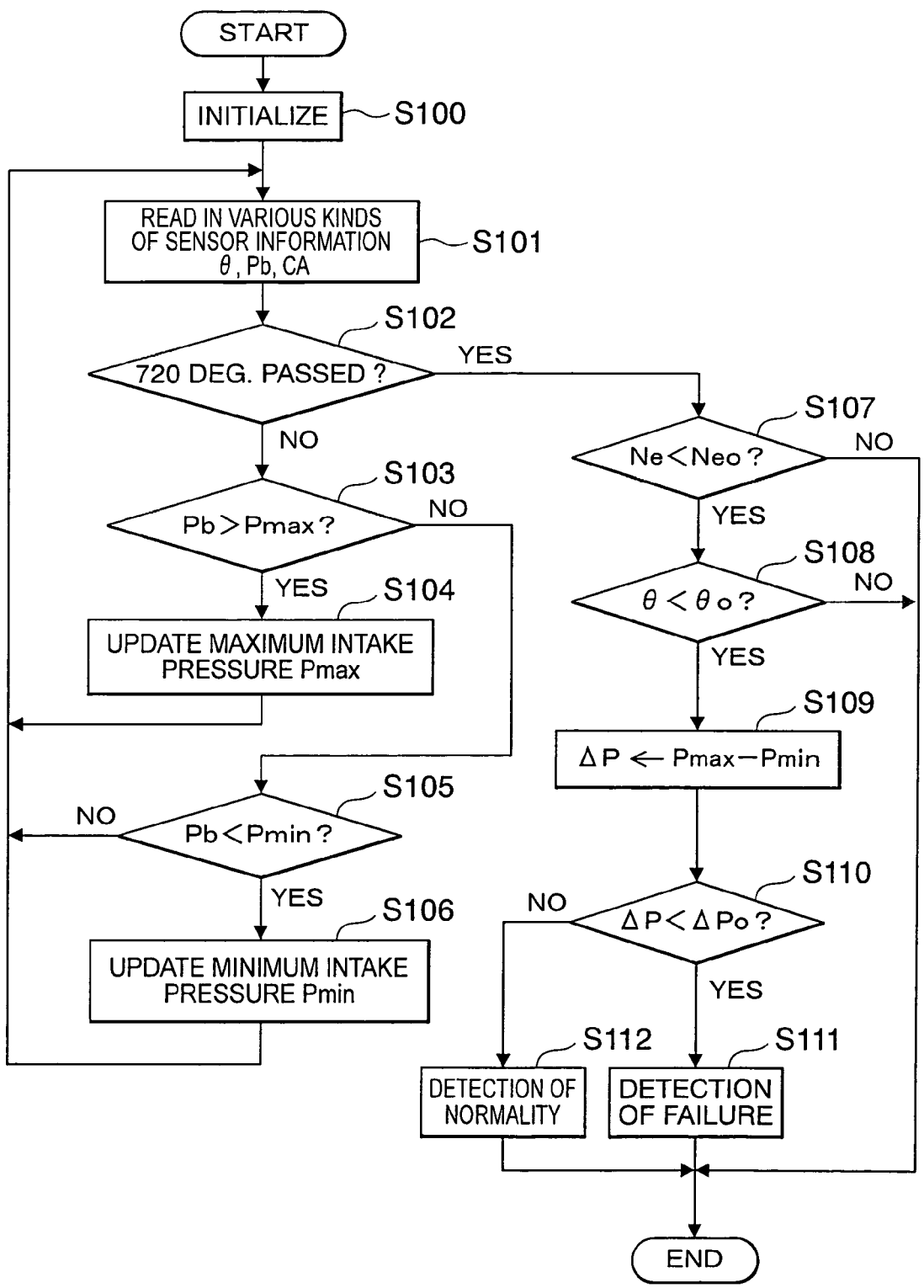
FIG. 5 is a flow chart illustrating a concrete operation of the control apparatus for an internal combustion engine according to the first embodiment of the present invention.

In FIG. 5, first of all, the microcomputer 10 executes initialization processing on the respective values of the maximum intake pressure Pmax, the minimum intake pressure Pmin and other variable values (step S100), and thereafter reads the detection information of the various kinds of sensors (the throttle opening θ, the intake pressure Pb, the crank angle signal CA, etc.) (step S101), so that it determines from the crank angle signal CA whether a crank angle (=720 deg.) corresponding to one control cycle has passed (step S102).

When it is determined in step S102 that a crank angle of 720 deg. [CA] (one control cycle) has passed (that is, YES), the control flow shifts to step S107 to be described later, whereas when it is determined in step S102 that a crank angle of 720 deg. [CA] (one control cycle) has not yet passed (that is, NO), a determination is subsequently made as to whether the value of the currently detected intake pressure Pb is larger than the maximum intake pressure Pmax that has been detected until the last time (step S103).

When it is determined as Pb>Pmax in step S103 (that is, YES), the maximum intake pressure Pmax is updated to the value of the current intake pressure Pb (step S104), and the control flow returns to step S101 where the above-mentioned processing is repeatedly carried out, whereas when it is determined as Pb≦Pmax in step S103 (that is, NO), a determination is subsequently made as to whether the value of the currently detected intake pressure Pb is smaller than the minimum intake pressure Pmin that has been detected until the last time (step S105).

When it is determined as Pb<Pmin in step S105 (that is, YES), the minimum intake pressure Pmin is updated to the value of the current intake pressure Pb (step S106), and a return is carried out to step S101 where the above-mentioned processing is repeatedly carried out, whereas when it is determined as Pb≧Pmin in step S105 (that is, NO), a return to step S101 is carried out at once.

The processing steps S101 through S106 are repeated so that the detected value Pb from the intake pressure sensor 3 is compared with the maximum intake pressure Pmax and the minimum intake pressure Pmin, respectively, and the respective values of the maximum intake pressure Pmax and the minimum intake pressure Pmin are accordingly updated. When it is determined in step S102 that one control cycle (720 deg.) of the engine has passed (that is, YES), it is assumed that the measurements of the respective values of the maximum intake pressure Pmax and the minimum intake pressure Pmin within one control cycle are terminated, and it is subsequently determined whether the current rotational speed Ne is lower than a predetermined rotational speed Neo (step S07).

The predetermined rotational speed Neo corresponds to an upper limit value within a range of the rotational speed Ne in which any incorrect determination can not be made (i.e., within the range of the idle rotational speed) when a failure determination based on the amount of change of the intake pressure Pb (the differential pressure ΔP) is executed.

When it is determined as Ne≧Neo in step S107 (that is, NO), it is assumed that the rotational speed Ne is a value within a range in which an incorrect determination can be made, and the processing flow of FIG. 5 is terminated without executing the failure determination processing.

On the other hand, when it is determined as Ne<Neo in step S107 (that is, YES), it is assumed that the current engine rotational speed Ne is within the range in which a failure determination based on the amount of change of the intake pressure Pb can be executed (i.e., any incorrect determination can not be made), and it is subsequently determined whether the current throttle opening θ is smaller than a predetermined degree of opening θo (step S108).

The predetermined degree of opening θo corresponds to an upper limit value within the range of the throttle opening θ in which any incorrect determination can not be made when a failure determination based on the amount of change of the intake pressure Pb is performed.

When it is determined as θ≧θo in step S108 (that is, NO), it is assumed that the throttle opening θ is a value within a range in which an incorrect determination can be made, and the processing flow of FIG. 5 is terminated without executing the failure determination processing.

On the other hand, when it is determined as θ<θo in step S108 (that is, YES), it is assumed that the current throttle opening θ is within the range in which a failure determination based on the amount of change of the intake pressure Pb can be executed (i.e., any incorrect determination can not be made), and a failure determination based on the amount of change of the intake pressure Pb is executed as follows.

That is, the steps S107 and S108 function as an idle detection section, and only when both the determination condition or criterion for the throttle opening θ (step S107) and the determination condition or criterion for the rotational speed Ne (step S108) are satisfied, the failure diagnosis section calculates the differential pressure ΔP (=Pmax−Pmin) between the maximum intake pressure Pmax and the minimum intake pressure Pmin (step S109), and determines whether the differential pressure ΔP is smaller than the predetermined value ΔPo (step S110).

The predetermined value ΔPo is preset so as to correspond to an upper limit value of the differential pressure ΔP that corresponds to the "tubing disconnection state" of the intake pressure sensor 3 at the time of idle operation.

When it is determined as ΔP<ΔPo in step S110 (that is, YES), it is assumed that the intake pressure sensor 3 is in a "tubing disconnection failure state" in which there is no change in the intake pressure Pb, so a failure detection flag (step S111) is sep up, and the processing flow of FIG. 5 is terminated.

On the other hand, when it is determined as ΔP≧ΔPo in step S110 (that is, NO), it is assumed that there is a change in the intake pressure Pb (i.e., the intake pressure sensor 3 is in a normal state), so the failure detection flag (step S112) is cleared to a normality detection state, and the processing flow of FIG. 5 is terminated.

When the rotational speed Ne and the throttle opening θ during operation of the engine indicate an idle operation state (or a low rotational speed, a low or small throttle opening state), as previously stated, the intake pressure Pb in the intake manifold decreases on the intake stroke, and becomes the maximum intake pressure Pmax (the atmospheric pressure or a value corresponding to the atmospheric pressure) on the exhaust stroke, in which the intake valve and the exhaust valve are closed.

Accordingly, as stated above, by detecting the amount of change of the intake pressure Pb (the differential pressure ΔP) within one control cycle of the engine (a crank angle of 720 deg.), it is possible to detect a "tubing disconnection failure state" of the intake pressure sensor 3. In addition, by driving the warning LED 8 upon detection of the tubing disconnection failure of the intake pressure sensor, it is possible to provide a warning to the user so as to prompt him or her to take appropriate measures for the occurrence of failure as required.

Embodiment 2

In the above-mentioned first embodiment, no reference has been made to specific processing of the microcomputer 10 in case where it is determined that the intake pressure sensor 3 is in a faulty or failure state, but when it is determined that an intake pressure sensor corresponding to one of the two cylinders is in a faulty or failure state, engine control can still be continued based on the detection information of a normally operating intake pressure sensor corresponding to the other cylinder.

In this case, as stated above, in order to measure intake pressures Pb1, Pb2 in the cylinders (e.g., two), respectively, the intake pressure sensor 3 includes a plurality of intake pressure sensors (e.g., two) corresponding in number to the number of the cylinders. In addition, if it is determined that either of the two intake pressure sensors is abnormal, the microcomputer 10 controls a cylinder corresponding to an intake pressure sensor, which has been determined as abnormal, by using an intake pressure from the other intake pressure sensor which has been determined as normal (i.e., determined as not abnormal).

Specifically, when it is determined that the tubing of one of the intake pressure sensors 3 is disconnected as a result of the execution of failure determination processing (steps S109 and S110 in FIG. 5), or when it is determined that a signal line for one intake pressure sensor 3 is broken (open-circuited) or short-circuited, engine control is continued by using a signal from the other intake pressure sensor, which indicates a normal value, while inhibiting the use of the detection signal of the one intake pressure sensor, which has been determined as abnormal or faulty.

Thus, in an engine system that has a plurality of intake pressure sensors mounted one for each of a plurality of cylinders, when one of the intake pressure sensors fails, by assuming a sensor signal from another unfailed or normally operating intake pressure sensor to be the value of the abnormal or failed sensor signal and by using the same value, it is possible to perform the processing of calculating the amount of fuel to be injected, the timing of fuel injection and the timing of ignition, the processing of identifying the strokes of the respective cylinders, the processing of estimating the atmospheric pressure, etc., by utilizing the normal intake pressure sensor in place of the failed intake pressure sensor. As a result, the engine control can be continued even if one of the intake pressure sensors has failed.

In general, in an engine system that has a plurality of intake pressure sensors one for each cylinder, the detected values of the intake pressure sensors for the respective cylinders are subtly different from each other depending on various factors such as the layouts of an intake system and an exhaust system, etc., so it is possible to unleash the full performance of the engine in an effective manner by optimizing the amount of fuel to be injected by the use of a subtle difference among the respective detected values.

According to the second embodiment of the present invention, by assigning the signal of an other normal intake pressure sensor to the signal of an abnormal or faulty intake pressure sensor, it is possible to make the engine operation continue without reducing the engine performance to any substantial extent while unable to perform optimization according to the subtle difference among the respective cylinders.

Although in the above-mentioned first and second embodiments, reference has been made to the case where the present invention is applied to a V-type two-cylinder engine for an motorcycle, it is needless to say that similar effects or advantages can be obtained even if the present invention is applied to other multi-cylinder engines as far as the engines use the intake pressure sensors 3 with tubing. In addition, although the warning LED 8 is used as a warning device, other warning devices such as other kinds of display devices, voice generation devices, etc., may be used as long as they can provide a warning to the user thereby to prompt him or her to take appropriate measures to cope with a situation thus warned.

While the invention has been described in terms of preferred embodiments, those skilled in the art will recognize that the invention can be practiced with modifications within the spirit and scope of the appended claims.

What is claimed is:

1. A control apparatus for an internal combustion engine comprising:
    a throttle opening detection part that measures a throttle opening of a throttle valve arranged in an intake system of said internal combustion engine;
    an intake pressure detection part that measures an intake pressure of said intake system;
    a crank angle detection part that detects a crank angle of said internal combustion engine;
    a rotational speed detection part that detects a rotational speed of said internal combustion engine; and
    a control unit that controls said internal combustion engine based on said throttle opening, said intake pressure, said rotational speed and said the crank angle;
    wherein said intake pressure detection part includes an intake pressure sensor connected to said intake system through tubing;
    said control unit includes a failure diagnosis section that detects an abnormality of said intake pressure detection part; and
    said failure diagnosis section detects an open-circuit or a short-circuit of a signal line between said intake pressure sensor and said control unit based on a change in said intake pressure, and also detects a disconnection failure of said tubing of said intake pressure sensor;
    and wherein an idle detection section detects an idle state of said internal combustion engine;
    wherein when an amount of change of said intake pressure within one control period of said internal combustion engine in an idle state thereof indicates a predetermined amount of change corresponding to a full open state of said throttle opening, said failure diagnosis section makes a determination that said tubing for said intake pressure sensor is in a disconnection failure state.

2. An apparatus for an internal combustion engine as set forth in claim 1, wherein
    said failure diagnosis section calculates a differential pressure between a maximum intake pressure on an exhaust stroke of said internal combustion engine and a minimum intake pressure on an intake stroke of said internal combustion engine as the amount of change of said intake pressure.

3. The control apparatus for an internal combustion engine as set forth in claim 1, wherein
    said internal combustion engine is a V-type two-cylinder engine for a motorcycle.

4. The control apparatus for an internal combustion engine as set forth in claim 1, further comprising:
    a warning device connected to said control unit;
    wherein said control unit drives said warning device when a tubing disconnection failure of said intake pressure sensor is detected.

5. A control apparatus for an internal combustion engine comprising:
    a throttle opening detection part that measures a throttle opening of a throttle valve arranged in an intake system of said internal combustion engine;
    an intake pressure detection part that measures an intake pressure of said intake system;
    a crank angle detection part that detects a crank angle of said internal combustion engine;
    a rotational speed detection part that detects a rotational speed of said internal combustion engine; and
    a control unit that controls said internal combustion engine based on said throttle opening, said intake pressure, said rotational speed and said the crank angle;
    wherein said intake pressure detection part includes an intake pressure sensor connected to said intake system through tubing;
    said control unit includes a failure diagnosis section that detects an abnormality of said intake pressure detection part; and
    said failure diagnosis section detects an open-circuit or a short-circuit of a signal line between said intake pressure sensor and said control unit based on a change in said intake pressure, and also detects a disconnection failure of said tubing of said intake pressure sensor;
    and wherein said internal combustion engine has a plurality of cylinders;
    said intake pressure detection part includes a plurality of intake pressure sensors corresponding in number to the number of said cylinders so as to individually measure the respective intake pressures in said plurality of cylinders; and
    when it is determined that either of said intake pressure sensors is abnormal, said control unit controls a cylinder corresponding to an intake pressure sensor which has been determined as abnormal by using an intake pressure from an intake pressure sensor which has been determined as normal.

6. The control apparatus for an internal combustion engine as set forth in claim 5, wherein
    said internal combustion engine is a V-type two-cylinder engine for a motorcycle.

7. The control apparatus for an internal combustion engine as set forth in claim 5, further comprising:
    a warning device connected to said control unit;
    wherein said control unit drives said warning device when a tubing disconnection failure of said intake pressure sensor is detected.

* * * * *